(12) United States Patent  
Barnett

(10) Patent No.: US 7,413,400 B2  
(45) Date of Patent: Aug. 19, 2008

(54) VANE ASSEMBLY WITH GROMMET

(75) Inventor: Barry Barnett, Markham (CA)

(73) Assignee: Pratt & Whitney Canada Corp., Longueuil (CA)

( * ) Notice: Subject to any disclaimer, the term of this patent is extended or adjusted under 35 U.S.C. 154(b) by 479 days.

(21) Appl. No.: 11/223,148

(22) Filed: Sep. 12, 2005

(65) Prior Publication Data

US 2007/0237633 A1    Oct. 11, 2007

(51) Int. Cl.  
*F01D 9/00* (2006.01)

(52) U.S. Cl. ............... 415/119; 415/189; 415/190; 415/191

(58) Field of Classification Search ............ 415/119, 415/189, 190, 191  
See application file for complete search history.

(56) References Cited

U.S. PATENT DOCUMENTS

| 3,501,247 | A |   | 3/1970  | Tournere |
| 3,849,023 | A |   | 11/1974 | Klompas |
| 3,985,465 | A |   | 10/1976 | Sheldon et al. |
| 4,180,371 | A |   | 12/1979 | Ivanko |
| 4,305,696 | A |   | 12/1981 | Pask |
| 4,655,682 | A | * | 4/1987  | Kunz et al. ............ 415/119 |
| 4,820,120 | A |   | 4/1989  | Feuvier et al. |
| 4,820,124 | A |   | 4/1989  | Fried |
| 4,907,944 | A |   | 3/1990  | Kroger et al. |
| 4,940,386 | A |   | 7/1990  | Feuvrier et al. |
| 5,074,752 | A |   | 12/1991 | Murphy et al. |
| 5,269,649 | A |   | 12/1993 | Kiefer et al. |
| 5,494,404 | A |   | 2/1996  | Furseth et al. |
| 5,547,342 | A |   | 8/1996  | Furseth et al. |
| 5,690,469 | A | * | 11/1997 | Deal et al. ............ 415/189 |
| 5,765,993 | A | * | 6/1998  | Weiss .................. 415/209.2 |
| 6,409,472 | B1 |  | 6/2002  | McMahon et al. |
| 6,494,677 | B1 |  | 12/2002 | Grady |
| 6,543,995 | B1 |  | 4/2003  | Honda et al. |
| 6,619,917 | B2 | * | 9/2003 | Glover et al. ......... 415/209.3 |
| 6,854,960 | B2 |  | 2/2005  | Van Dine et al. |
| 2005/0022501 | A1 |  | 2/2005 | Eleftheriou et al. |
| 2005/0109013 | A1 |  | 5/2005 | Eleftheriou et al. |

FOREIGN PATENT DOCUMENTS

CA    840.224    4/1970

* cited by examiner

*Primary Examiner*—Igor Kershteyn  
(74) *Attorney, Agent, or Firm*—Ogilvy Renault LLP

(57) ABSTRACT

A vane assembly for a gas turbine engine including a shroud ring with openings and isolating arrangement isolating a vane extremity within each opening, the isolating arrangement cooperating to form a continuous gas path surface completely covering at least an axial portion of a surface of the shroud ring.

12 Claims, 7 Drawing Sheets

VANE ASSEMBLY WITH GROMMET

TECHNICAL FIELD

The invention relates generally to gas turbine engines, and particularly to improved inlet guide vanes provided therein downstream of the engine fan or low pressure compressor.

BACKGROUND OF THE ART

Gas turbine engine vane assemblies are usually provided downstream of the engine fan and/or of a low pressure compressor to reduce the swirl in the air flow entering the high speed compressor. Such guide vane assemblies must be resistant to foreign object damage while having a minimal weight.

It is known to provide an inner shroud with slots receiving the vane tips in order to retain them. In such a configuration, a grommet is inserted in the slotslot such as to surround the vane tip thereby isolating the vane tip from the shroud. However, during a foreign object damage event a vane which is hit will move rearward as a result of the impact, and the vane edge, which tends to be sharp, can cause cutting of the grommet and damage to other surrounding components. Also, the airflow surrounding the grommets often produces a force which tends to lift and displace the grommets, thus requiring the use of adhesive or other similar measures to ensure that they stay in place. Such a use of adhesive complicates the installation and replacement of vanes. Moreover, the protruding grommets can disturb the airflow, which can alter the engine's performance.

Accordingly, there is a need to provide an improved vane assembly.

SUMMARY OF THE INVENTION

It is therefore an object of this invention to provide an improved vane assembly.

In one aspect, the present invention provides a vane assembly comprising: a shroud including at least one annular shroud ring having inner and outer surfaces extending along an axial direction of the shroud ring, the inner surface facing a fluid flow passage defined through said vane assembly, the shroud ring defining a plurality of openings extending between said inner and outer surfaces and distributed about a circumference of the annular shroud ring; a plurality of vanes supported by said shroud and radially extending from said shroud ring, each vane having an extremity received within a corresponding one of the plurality of openings; and a grommet located in each one of the plurality of openings and isolating the vane extremity from the shroud ring, the grommet having a cut-out defined therethrough for receiving the vane extremity, each said grommet having a base portion in contact with the inner surface and abutting adjacent said grommets to form a continuous gas path surface of said grommet base portions on said inner surface along at least a portion of the axial direction.

In another aspect, the present invention provides a vane assembly for a gas turbine engine, the vane assembly comprising: a shroud ring defining a circumference and an axially extending surface facing a fluid flow passage defined through said vane assembly the shroud ring having openings defined therein and distributed about the circumference; a plurality of vanes supported by and radially extending from said shroud ring, each said vane having an extremity received in a corresponding one of the openings; and means for isolating the vane extremity from the shroud ring, said means being disposed within the corresponding ones of the openings, the isolating means cooperating to form a continuous gas path surface completely covering at least a portion of the axially extending surface of the shroud ring.

In another aspect, the present invention provides a method for forming a continuous gas path surface within a vane assembly of a gas turbine engine, the method comprising the steps of: forming an annular shroud ring defining a circumferential surface which extends a first distance in an axial direction; forming a plurality of openings in the shroud ring, the openings being distributed about the circumference; inserting one of a plurality of grommets in each one of the plurality of openings; and placing adjacent ones of said plurality of grommets to form a continuous annular gas path surface extending about a full circumference of said circumferential surface, the gas path surface extending along said circumferential surface at least a portion of the first distance in said axial direction.

There is further provided, in accordance with the present invention, a grommet for a gas turbine engine vane assembly including a plurality of vanes with at least an extremity thereof received within corresponding openings defined in an annular shroud ring having a surface facing a fluid flow passage through said gas turbine vane assembly, the grommet comprising: a recessed portion receivable within each of the openings of the shroud ring and defining a cut-out therethrough corresponding to the vane extremity adapted to be received therein, thereby isolating the vane extremity from the shroud ring; and a base portion connected to an end of said recessed portion and adapted to contact the surface of the annular shroud ring when said recessed portion is disposed within the openings, said base portion defining two opposed lateral surfaces spaced apart a predetermined lateral distance dependent on a lateral spacing of the openings such that each of the opposed lateral surfaces abut adjacent lateral surfaces of the base portion of a next adjacent grommet to form a continuous gas path surface of said grommet base portions on said inner surface of the shroud ring.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
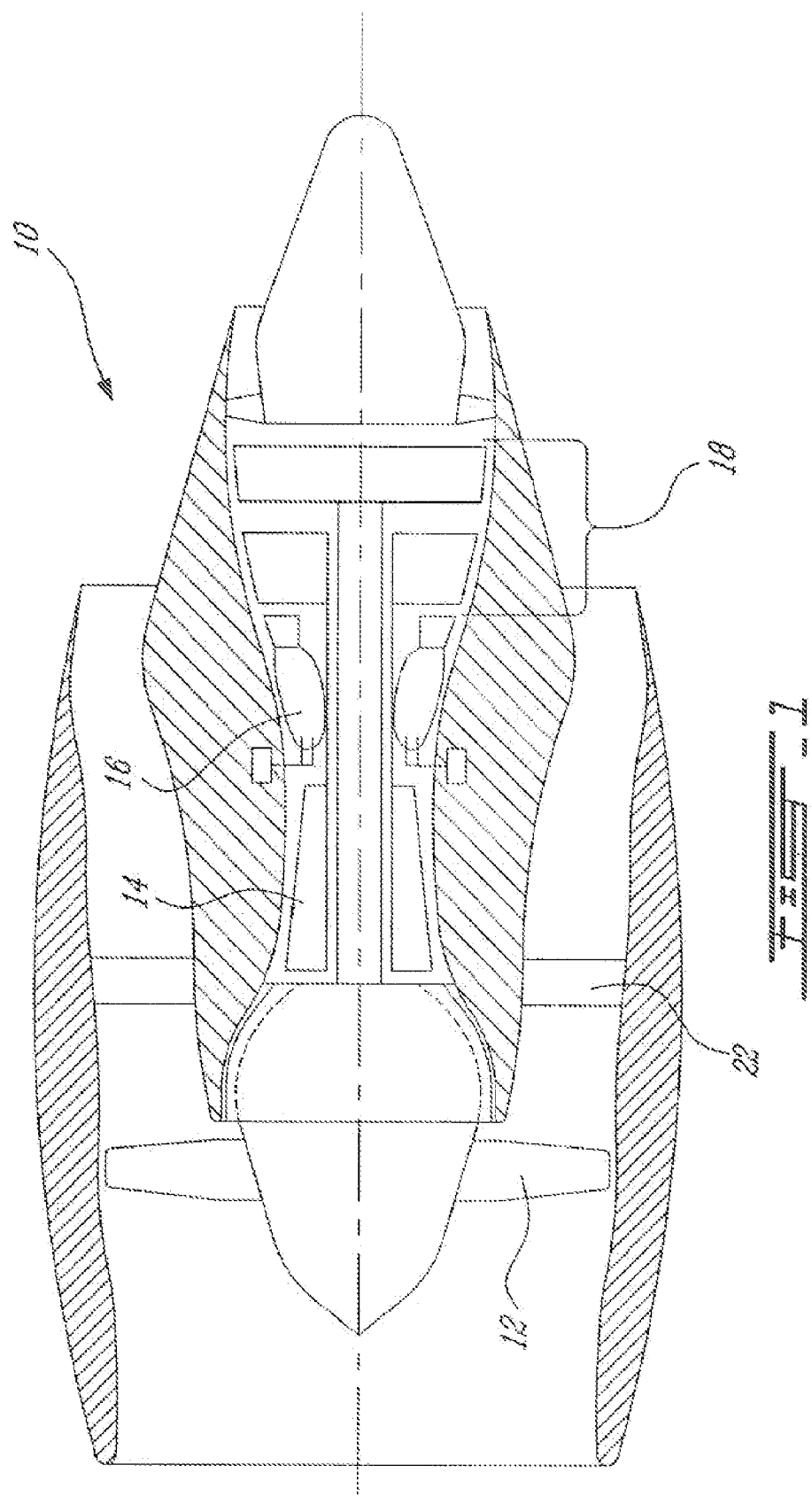
FIG. 1 is a side view of a gas turbine engine, in partial cross-section.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine 18 for extracting energy from the combustion gases.

Figure 2:
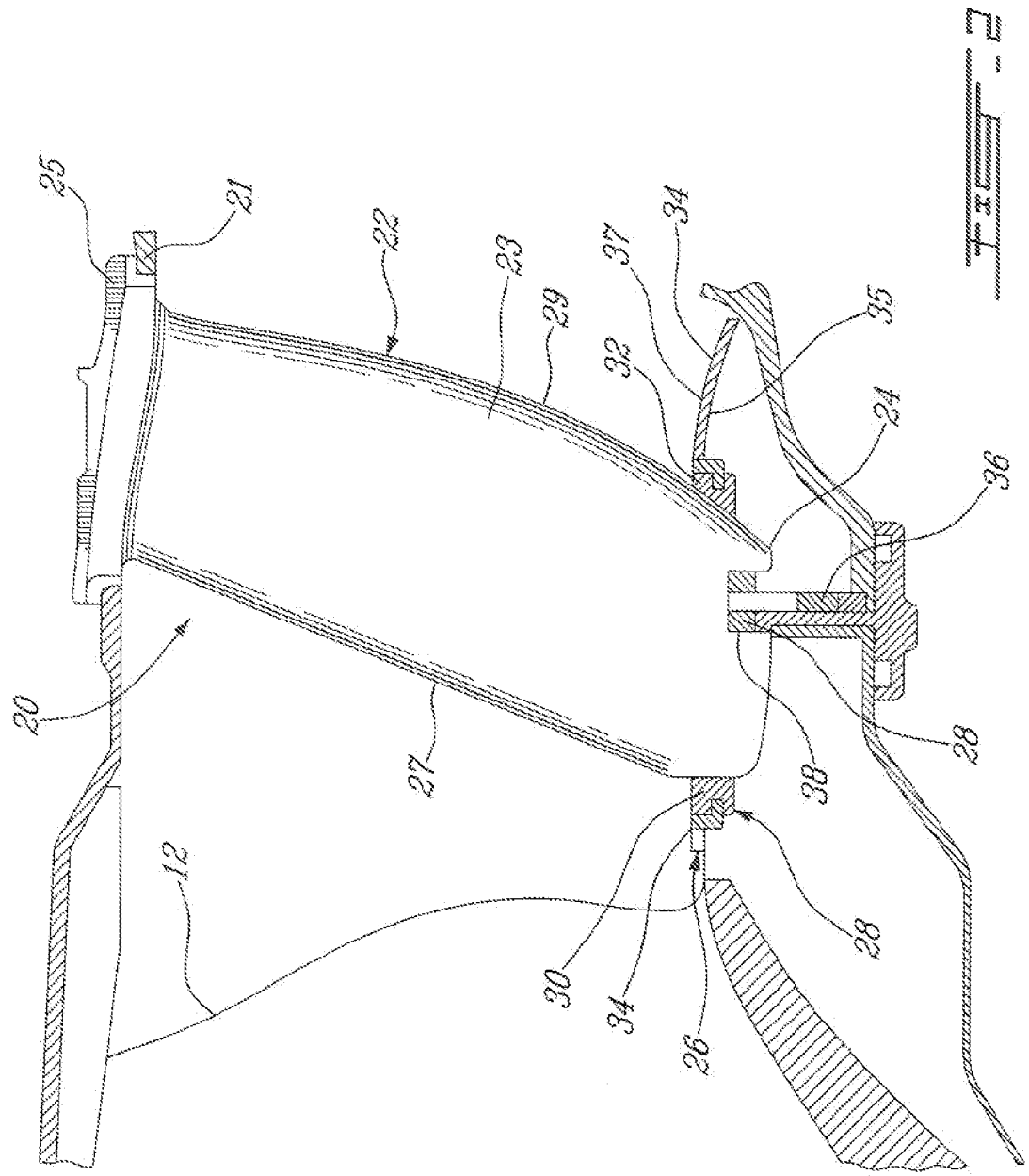
FIG. 2 is a side cross-sectional view of a guide vane assembly according to an embodiment of the present invention.

Referring to the FIG. 2, the vane assembly 20, preferably but not necessarily a guide vane assembly, is located downstream of the fan 12. The vane assembly 20 includes an inner shroud 26 and a plurality of vanes 22 extending radially between the inner shroud 26 and an engine casing or an outer shroud 21. The inner shroud 26 includes a shroud ring 34 and a shroud web 36. Each of the vanes 22 has an airfoil portion 23 extending between the vane tip 24 and the vane root 25. The vane root 25 is attached to the outer shroud 21 and the vane tip 24 is retained in a grommet 28 inserted into an opening 54 (see FIG. 5) of the shroud ring 34. Throughout this description, the axial, radial and circumferential directions are defined respectively with respect to the central axis, radius and circumference of the shroud ring 34.

Figure 3:
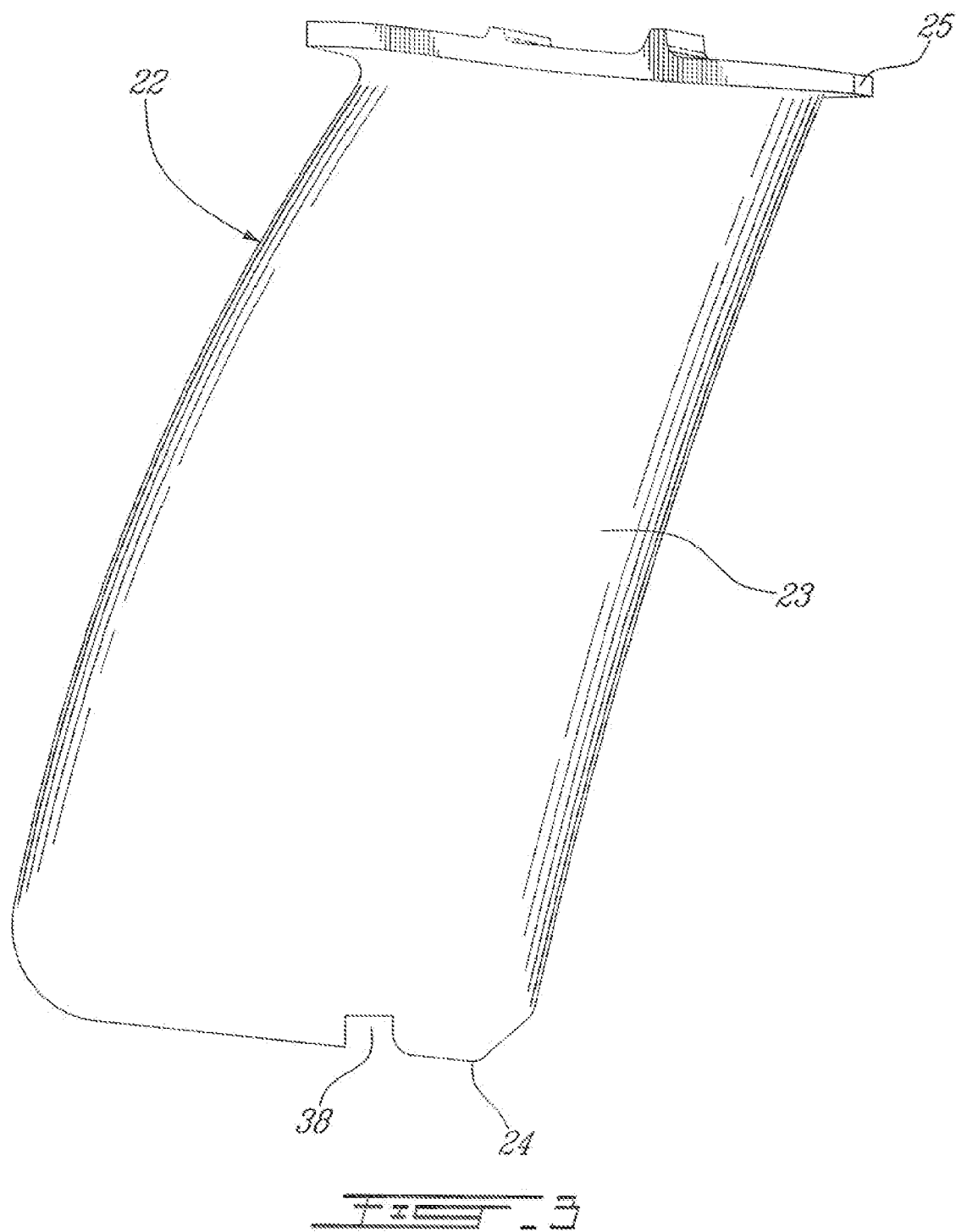
FIG. 3 is a perspective side view of a guide vane which is part of the assembly shown in FIG. 2.

As best seen in FIG. 3, the airfoil portion 23 of each vane 22 defines a leading edge 27 and a trailing edge 29, such that an airflow passing through the vane assembly 20 will flow from the leading edge 27 to the trailing edge 29. The vane tip 24 includes a slot 38 defined therein and located between the leading and trailing edges 27, 29. The slot 38 has a generally rectangular shape and extends radially from the vane tip 24.

Figure 4:
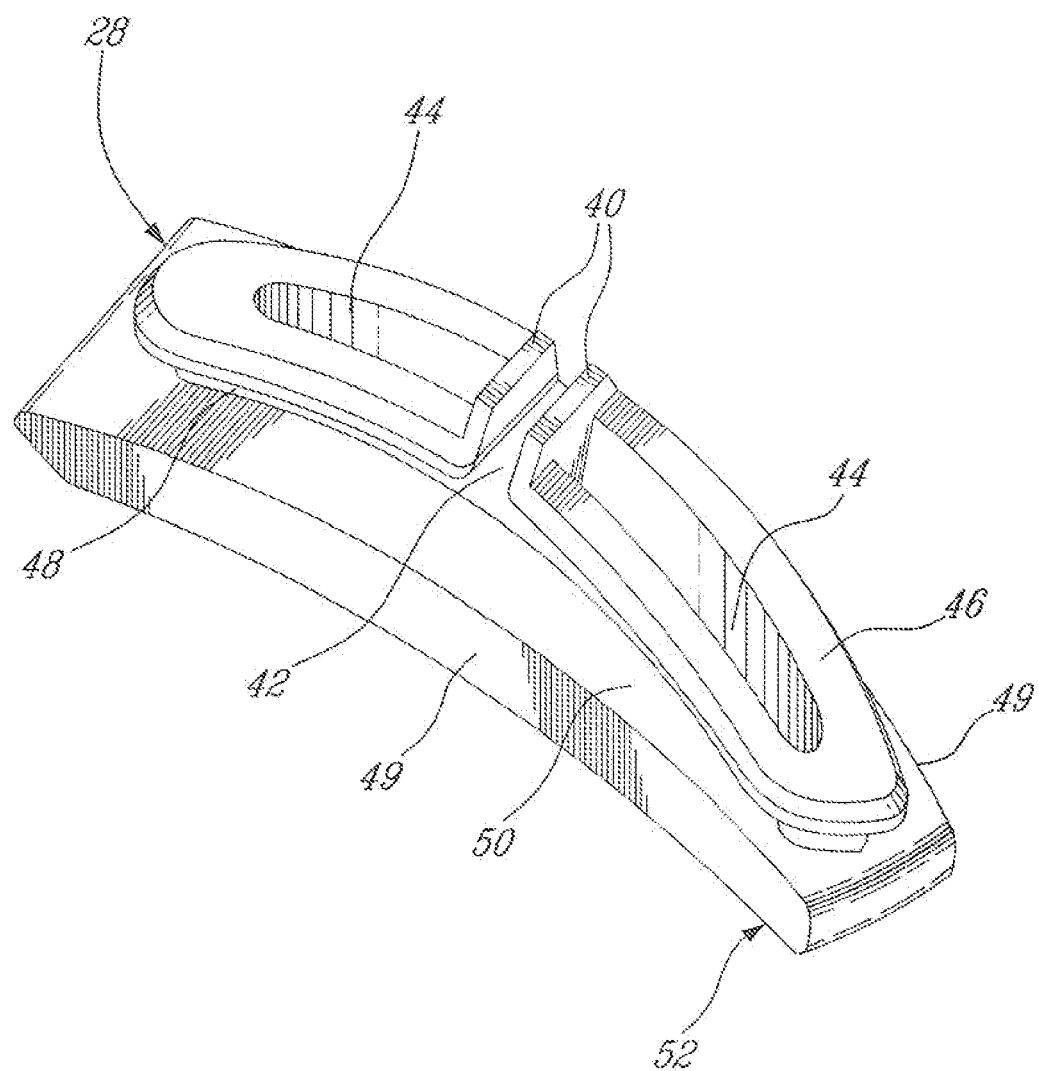
FIG. 4 is a perspective underside view of a grommet which is part of the assembly shown in FIG. 2.

Referring to FIG. 4, each grommet 28 includes a base portion 50 connected to a lip 46 by a recessed portion 48. The base portion 50 defines two opposite elongated lateral surfaces 49 extending generally along the axial direction. Two spaced apart tongues 40 extend perpendicularly from the lip 46 along the circumferential direction and define a slot 42 therebetween. A cutout 44 corresponding in shape to the vane tip 24 is defined within the grommet 28, extends through the base and recessed portions 50, 48, and is bordered by the lip 46. The grommet 28 also has a leading edge 30 and a trailing edge 32 connecting the lateral surfaces 49 and corresponding to the leading and trailing edges 27, 29 of the associated vane 22, as can be seen in FIG. 2. The grommets 28 are preferably made of a flexible material, such as rubber or the like, in order to be able to dampen vibrations of the assembly.

Figure 5:
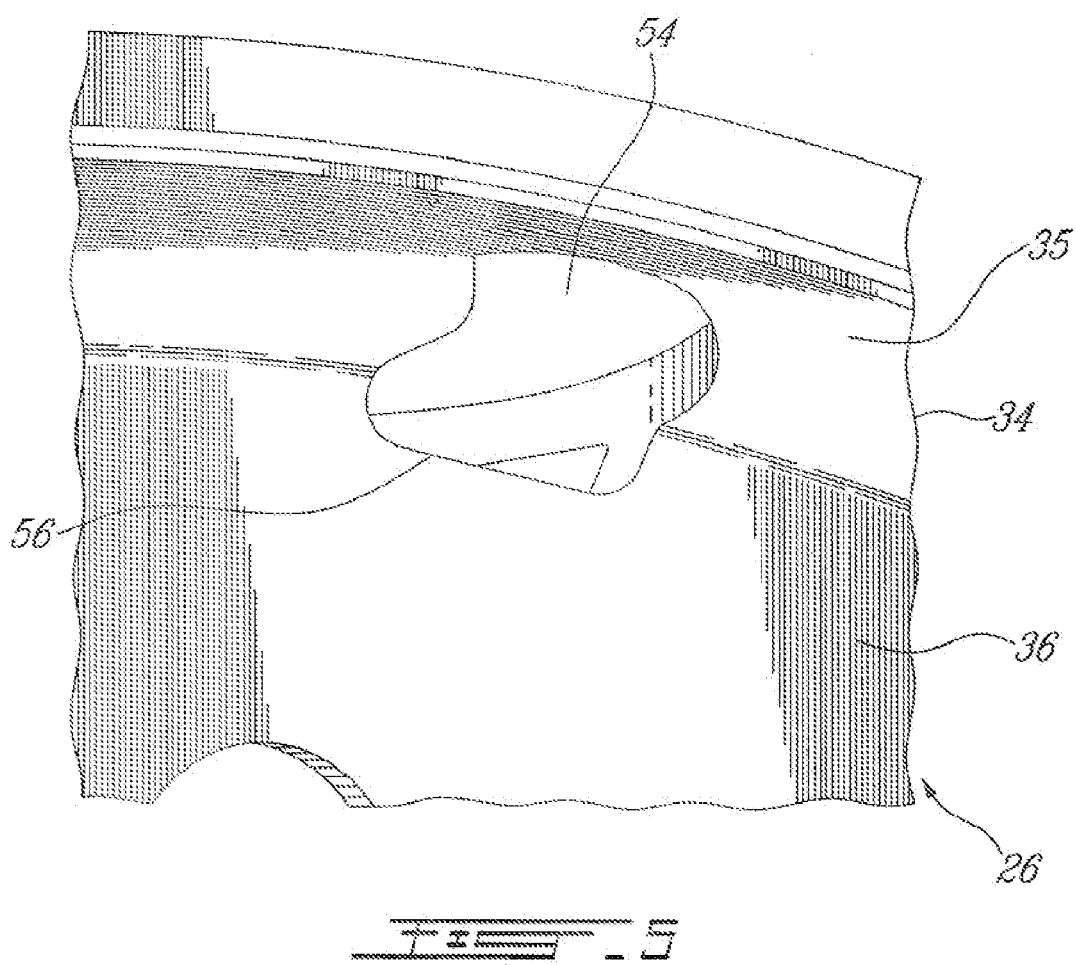
FIG. 5 is a perspective side view of a portion of an inner shroud which is part of the assembly shown in FIG. 2.

Referring to FIGS. 2 and 5, the shroud ring 34 has an inner surface 35 and an outer surface 37 defining a circumference of the shroud 26. The shroud web 36 is circular and extends generally radially from the inner surface 35 of the shroud ring 34 around the entire circumference thereof. The openings 54 are distributed along the circumference of the shroud ring 34. Each opening 54 corresponds in shape to the recessed portion 48 of one of the grommets 28 and is oriented according to a desired orientation of the vane 22 within the airflow. Thus, a grommet 28 is receivable within each opening 54, with the base portion 50 thereof abutting the outer surface 37 and the lip 46 abutting the inner surface 35. Adjacent to each opening 54, a mating slot 56 is defined within the shroud web 36.

Figure 6:
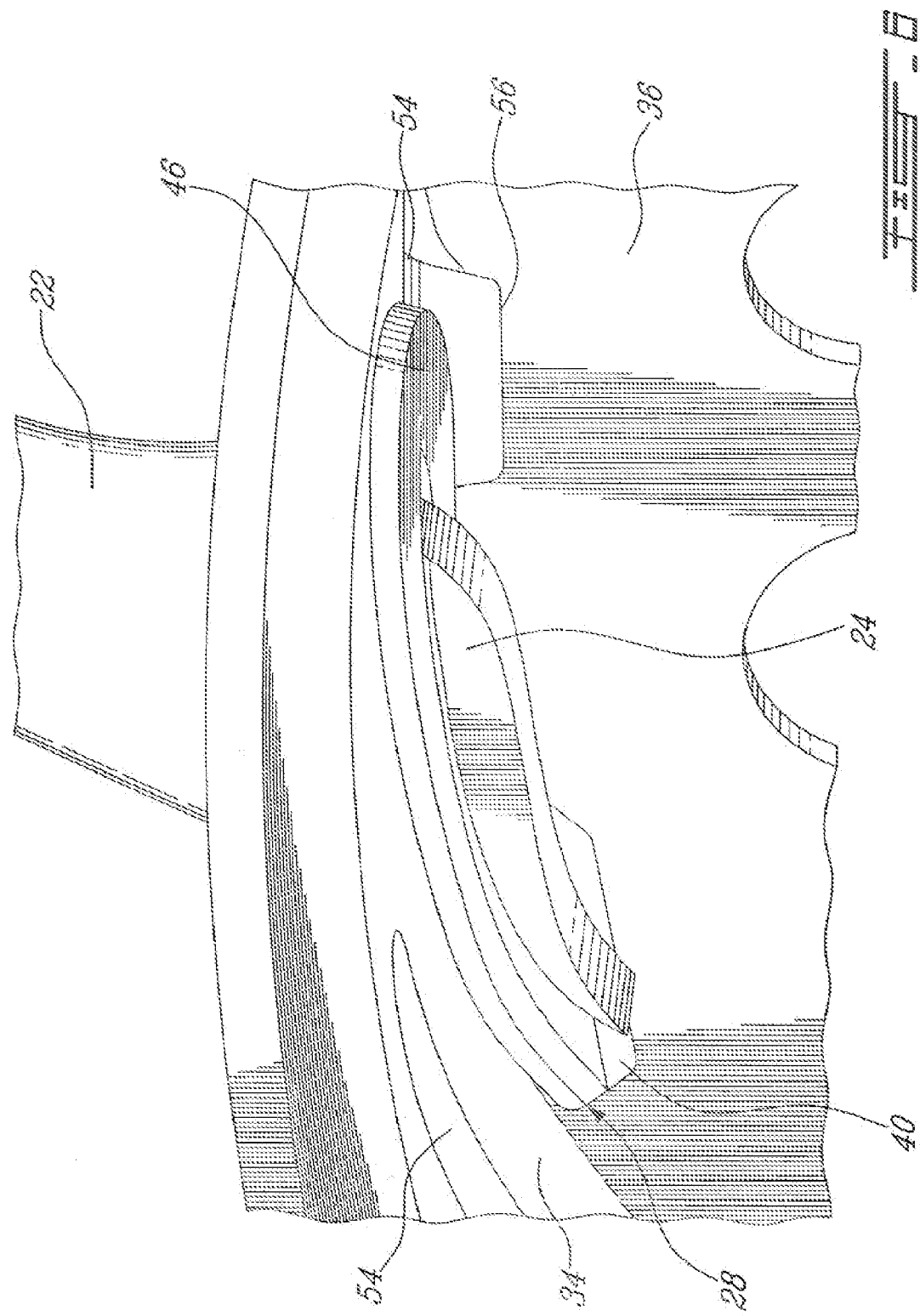
FIG. 6 is a perspective side view of a portion of the assembly shown in FIG. 2, showing a mating of the vane, grommet and inner shroud.

Referring to FIGS. 2, 4 and 6, each of the openings 54 of the shroud ring 34 receives the recessed portion 48 of a grommet 28. The shroud web 36, at the mating slot 56, is received within the slot 42 of the grommet 28, with one of the tongues 40 abutting each side of the web 36. The vane tip 24 is inserted into the grommet cutout 44, the tongues 40, and shroud web 36 being received within the vane slot 38. Alternately, it is also possible to provide a deeper grommet slot 42 and vane slot 38 such as to eliminate the need for the mating slot 56.

Figure 7:
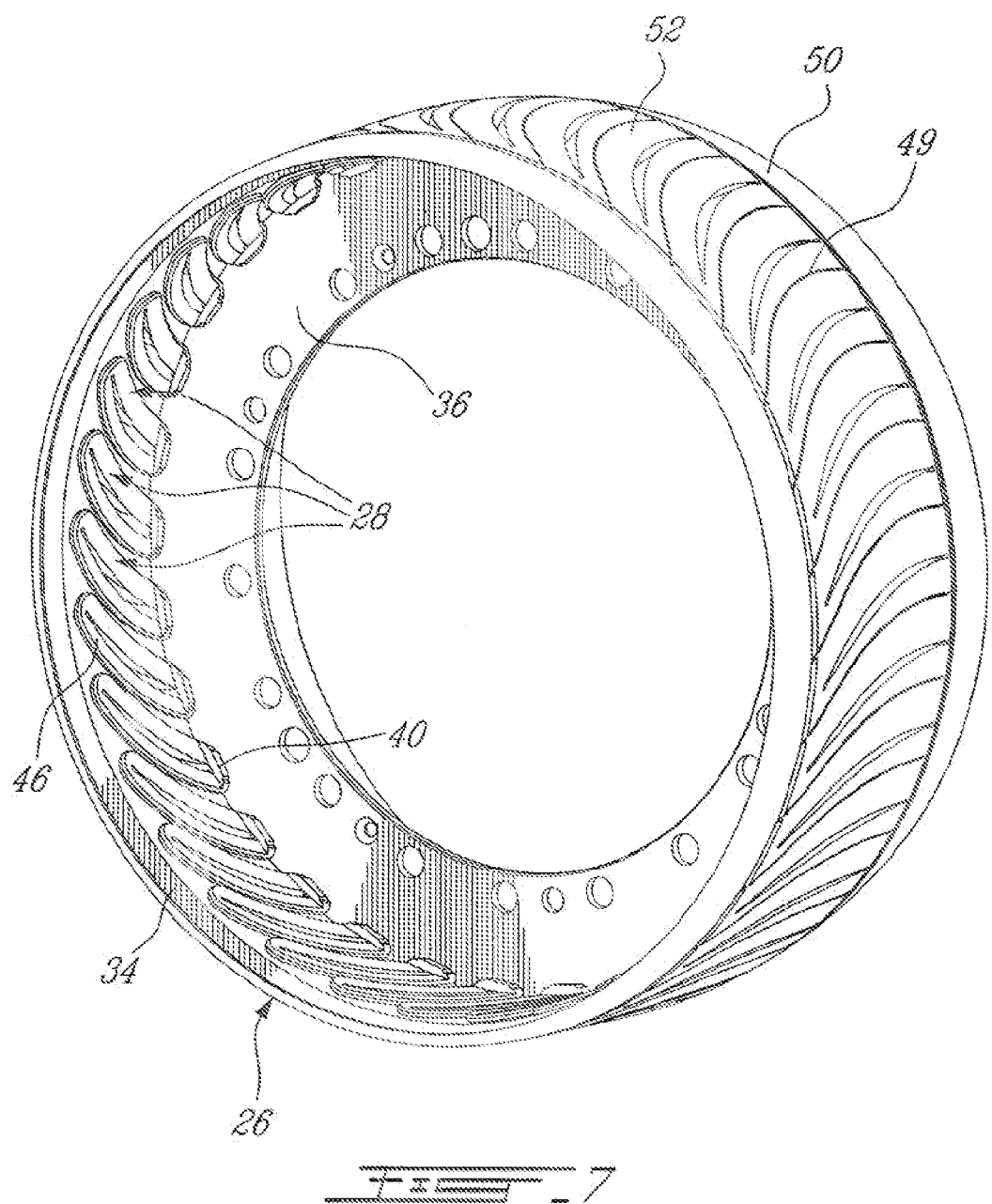
FIG. 7 is a perspective side view of an inner shroud and grommet assembly according to the present invention.

Referring to FIGS. 4 and 7, the base portion 50 of each grommet 28 is shaped so that upon installation of the grommets 28, the lateral surfaces 49 of each grommet 28 will be in close contact with the lateral surfaces 49 of adjacent grommets 28, such that the base portions 50 together form a continuous gas path surface 52 along the entire circumference and at least an axial portion of the shroud 26. This configuration eliminates the need to use adhesives or similar measures to maintain the grommets in position, since the gas flows over the grommets, "pushing" them radially inward, instead of flowing between them and producing a lifting force thereon. The airflow is also smoother since it is not perturbed by an uneven surface which would be produced with conventional grommets having free spaces therebetween.

Alternatively, it is possible to provide an annulus portion or an entire annulus formed by the combined base portions 50 of the grommets 28, which are integrally connected to each other through the lateral surfaces 49 to form a single unit. In the case of an entire annulus, the grommets 28 would have to be made of a material sufficiently elastic to be able to stretch the annulus for insertion of the grommet lips 46 in into the shroud openings 54.

The vane assembly 20 thus efficiently retains the vane tip in the axial direction, providing additional stability to the vane position which reduces the risk of rearward movement of the vane tip 24 upon impact of a foreign object. This, in turn, reduces the risk of damage to the grommet 28 and adjacent components upon the impact of the foreign object. The vane slot 38 and mating slot 56 are easy to machine, and the grommet 28 with tongues 40 and slot 42 can be manufactured using the same process as other types of grommets.

The vane assembly 20 eliminates the need for adhesives or the like to maintain the grommets in place, which reduces costs and simplifies production and maintenance operations.

The above description is meant to be exemplary only, and one skilled in the art will recognize that changes may be made to the embodiments described without department from the scope of the invention disclosed. For example, the vane assembly 20 can be used for other types of engine stators as well as in different fields, such as in ventilation systems. The grommets 28 can be used in outer shrouds as well as other types of vanes or rotor blades. Still other modifications which fall within the scope of the present invention will be apparent to those skilled in the art, in light of a review of this disclosure, and such modifications are intended to fall within the appended claims.

The invention claimed is:

1. A vane assembly comprising:
   a shroud including at least one annular shroud ring having inner and outer surfaces extending along an axial direction of the shroud ring, the inner surface facing a fluid flow passage defined through said vane assembly, the shroud ring defining a plurality of openings extending between said inner and outer surfaces and distributed about a circumference of the annular shroud ring;
   a plurality of vanes supported by said shroud and radially extending from said shroud ring, each vane having an extremity received within a corresponding one of the plurality of openings; and
   a grommet located in each one of the plurality of openings and isolating the vane extremity from the shroud ring, the grommet having a cut-out defined therethrough for receiving the vane extremity, each said grommet having a base portion in contact with the inner surface and abutting adjacent said grommets to form a continuous gas path surface of said grommet base portions on said inner surface along at least a portion of the axial direction.

2. The vane assembly according to claim 1, wherein the base portion of each one of the plurality of grommets includes opposed lateral surfaces generally extending along the axial direction, the lateral surfaces abut adjacent lateral surfaces of adjacent ones of the plurality of grommets to form the continuous gas path surface.

3. The vane assembly according to claim 1, wherein the base portion of each one of the plurality of grommets is integral with the base portion of adjacent ones of the plurality of grommets to form the continuous gas path surface.

4. The vane assembly according to claim 3, wherein the plurality of grommets form an integral annulus defining the continuous gas path surface.

5. The vane assembly according to claim 1, wherein the shroud ring is part of an inner shroud.

6. The vane assembly according to claim 1, wherein the vane extremity is a vane tip.

7. A vane assembly for a gas turbine engine, the vane assembly comprising:
   a shroud ring defining a circumference and an axially extending surface facing a fluid flow passage defined through said vane assembly, the shroud ring having openings defined therein and distributed about the circumference;
   a plurality of vanes supported by and radially extending from said shroud ring, each said vane having an extremity received in a corresponding one of the openings; and
   means for isolating the vane extremity from the shroud ring, said means being disposed within the corresponding ones of the openings, the isolating means cooperating to form a continuous gas path surface completely covering at least a portion of the axially extending surface of the shroud ring.

8. The vane assembly according to claim 7, wherein each said means for isolating abuts an adjacent one of said means to form the continuous gas path surface.

9. The vane assembly according to claim 7, wherein the isolating means within all of the openings are integral and form an annulus defining the continuous gas path surface.

10. A method for forming a continuous gas path surface within a vane assembly of a gas turbine engine, the method comprising the steps of:
    forming an annular shroud ring defining a circumferential surface which extends a first distance in an axial direction;
    forming a plurality of openings in the shroud ring, the openings being distributed about the circumference;
    inserting one of a plurality of grommets in each one of the plurality of openings; and
    placing adjacent ones of said plurality of grommets to form a continuous annular gas path surface extending about a full circumference of said circumferential surface, the gas path surface extending along said circumferential surface at least a portion of the first distance in said axial direction.

11. The method according to claim 10, wherein the circumferential surface is covered by abutting adjacent ones of the base portions along lateral surfaces thereof, the lateral surfaces extending generally along the axial direction.

12. A grommet for a gas turbine engine vane assembly including a plurality of vanes with at least an extremity thereof received within corresponding openings defined in an annular shroud ring having a surface facing a fluid flow passage through said gas turbine vane assembly, the grommet comprising:
    a recessed portion receivable within each of the openings of the shroud ring and defining a cut-out therethrough corresponding to the vane extremity adapted to be received therein, thereby isolating the vane extremity from the shroud ring; and
    a base portion connected to an end of said recessed portion and adapted to contact the surface of the annular shroud ring when said recessed portion is disposed within the openings, said base portion defining two opposed lateral surfaces spaced apart a predetermined lateral distance dependent on a lateral spacing of the openings such that each of the opposed lateral surfaces abut adjacent lateral surfaces of the base portion of a next adjacent grommet to form a continuous gas path surface of said grommet base portions on said inner surface of the shroud ring.

* * * * *